US011381984B2

(12) United States Patent
Raghuramu et al.

(10) Patent No.: US 11,381,984 B2
(45) Date of Patent: Jul. 5, 2022

(54) DEVICE CLASSIFICATION BASED ON RANK

(71) Applicant: FORESCOUT TECHNOLOGIES, INC., San Jose, CA (US)

(72) Inventors: Arun Raghuramu, San Jose, CA (US); Yi Zhang, Santa Clara, CA (US); Yang Zhang, Fremont, CA (US); Siying Yang, Cupertino, CA (US)

(73) Assignee: ForeScout Technologies, Inc., San Jose, CA (US)

( * ) Notice: Subject to any disclaimer, the term of this patent is extended or adjusted under 35 U.S.C. 154(b) by 0 days.

(21) Appl. No.: 15/937,547

(22) Filed: Mar. 27, 2018

(65) Prior Publication Data

US 2019/0306731 A1 Oct. 3, 2019

(51) Int. Cl.
*H04L 47/2441* (2022.01)
*H04L 67/303* (2022.01)
(Continued)

(52) U.S. Cl.
CPC ............ *H04W 24/08* (2013.01); *H04L 43/04* (2013.01); *H04L 47/2441* (2013.01);
(Continued)

(58) Field of Classification Search
CPC . H04W 12/08; H04W 12/00; H04W 12/0027; H04W 48/18; H04W 4/50; H04W 24/08; H04W 48/16; H04L 63/1441; H04L 63/10; H04L 63/105; H04L 63/20; H04L 63/0876; H04L 63/1433; H04L 63/1425; H04L 63/1416; H04L 63/14; H04L 63/1408; H04L 2463/144; H04L 63/102; H04L 43/065; H04L 63/1458; H04L 63/145; H04L 43/04; H04L 47/127; H04L 47/2441; H04L 67/303; H04L 41/0893; H04L 45/70; H04L 63/1466; H04L 43/062; H04L 12/2816; H04L 41/0823; H04L 67/30; H04L 41/0213; G06F 21/566; G06F 21/554; G06F 21/00; G06F 21/577; G06F 11/3612; G06F 16/35; G06F 16/337;
(Continued)

(56) References Cited

U.S. PATENT DOCUMENTS 8,935,393 B1 * 1/2015 Jackson ............. G06Q 30/0631
709/224
2005/0138160 A1 * 6/2005 Klein ..................... H04L 41/22
709/223
(Continued)

OTHER PUBLICATIONS

Garcia et al., Survey on network-based botnet detection methods, Jun. 21, 2013, Wiley, vol. 7, Issue 5, pp. 878-903 (Year: 2013).*
(Continued)

*Primary Examiner* — Tonia L Dollinger
*Assistant Examiner* — Linh T. Nguyen
(74) *Attorney, Agent, or Firm* — Womble Bond Dickinson (US) LLP

(57) ABSTRACT

Systems, methods, and related technologies for device classification are described. In certain aspects, one or more properties are selected based on associated respective ranks. The selected one or more properties are used with information associated with the device to determine a classification. The classification may then be stored.

23 Claims, 5 Drawing Sheets

(51) Int. Cl.
| | | |
|---|---|---|
| *H04W 24/08* | (2009.01) | |
| *H04W 48/16* | (2009.01) | |
| *H04L 43/04* | (2022.01) | |
| *H04L 9/40* | (2022.01) | |
| *H04L 41/0213* | (2022.01) | |

(52) U.S. Cl.
CPC ........ *H04L 63/102* (2013.01); *H04L 63/1433* (2013.01); *H04L 63/1466* (2013.01); *H04L 67/303* (2013.01); *H04W 48/16* (2013.01); *H04L 41/0213* (2013.01); *H04L 63/0876* (2013.01)

(58) Field of Classification Search
CPC .. G06F 16/24578; G06F 16/55; G06F 16/735; G06F 16/285; H04M 3/42357; G06N 3/08; G06N 20/00
USPC .............................. 709/219; 726/3, 23, 25, 22
See application file for complete search history.

(56) References Cited

U.S. PATENT DOCUMENTS

| | | | | |
|---|---|---|---|---|
| 2005/0154861 | A1* | 7/2005 | Arimilli | G06F 9/5011 712/216 |
| 2008/0033899 | A1* | 2/2008 | Barnhill | G16B 40/20 706/48 |
| 2008/0233576 | A1* | 9/2008 | Weston | G06N 20/10 707/999.005 |
| 2010/0058329 | A1* | 3/2010 | Durazzo | H04L 69/40 717/176 |
| 2010/0071024 | A1* | 3/2010 | Eyada | H04L 63/1458 726/1 |
| 2010/0325412 | A1* | 12/2010 | Norrman | G06Q 10/06 713/100 |
| 2013/0304677 | A1* | 11/2013 | Gupta | G06N 5/043 706/12 |
| 2014/0122670 | A1* | 5/2014 | Levy | H04L 41/0893 709/220 |
| 2014/0173738 | A1* | 6/2014 | Condry | G06F 21/577 726/25 |
| 2015/0019342 | A1* | 1/2015 | Gupta | G06Q 10/20 705/14.66 |
| 2015/0032495 | A1* | 1/2015 | Senarath | G06Q 10/06313 705/7.23 |
| 2015/0067866 | A1* | 3/2015 | Ibatullin | G06F 21/554 726/25 |
| 2015/0229770 | A1* | 8/2015 | Shuman | H04M 3/54 379/211.02 |
| 2015/0237596 | A1* | 8/2015 | Carlsson | H04W 4/02 455/456.1 |
| 2015/0295808 | A1* | 10/2015 | O'Malley | H04L 47/22 709/224 |
| 2015/0381525 | A1* | 12/2015 | Roese | H04L 67/30 709/226 |
| 2016/0124071 | A1 | 5/2016 | Baxley et al. | |
| 2016/0192029 | A1* | 6/2016 | Bergstrom | H04L 45/125 725/109 |
| 2016/0248794 | A1* | 8/2016 | Cam | H04L 63/1433 |
| 2016/0350674 | A1* | 12/2016 | Midboe | H04L 67/22 |
| 2016/0366040 | A1* | 12/2016 | Nampelly | H04L 43/12 |
| 2017/0364576 | A1 | 12/2017 | Chesla et al. | |
| 2018/0096260 | A1* | 4/2018 | Zimmer | G06N 5/04 |
| 2018/0097856 | A1* | 4/2018 | Dange | H04L 67/10 |
| 2018/0196094 | A1* | 7/2018 | Fishburn | G01R 21/133 |
| 2018/0262991 | A1* | 9/2018 | Rao | H04L 43/0817 |
| 2018/0300333 | A1* | 10/2018 | Wang | G06N 20/00 |
| 2019/0028552 | A1* | 1/2019 | Johnson, II | H04L 45/306 |
| 2019/0052659 | A1* | 2/2019 | Weingarten | G06F 8/61 |
| 2019/0104140 | A1* | 4/2019 | Gordeychik | G06F 21/50 |
| 2019/0141064 | A1* | 5/2019 | Call | G06F 21/552 |
| 2019/0297103 | A1* | 9/2019 | Seshadri | H04L 67/18 |
| 2020/0110857 | A1* | 4/2020 | Burnette | H04L 63/0428 |

OTHER PUBLICATIONS

Markus Miettinen, et al.: "IoT Sentinel: Automated Device-Type Identification for Security Enforcement in IoT", arxiv.org, Dec. 13, 2016 (Dec. 13, 2016). XP055467286, Retrieved from the Internet: URL: https://arxiv.org/pdf/1611.04880.pdf [retrieved on Apr. 16, 2018] the whole document.

European Patent Office—International Search Report of the International Searching Authority for International Application No. PCT/US2019/021914 dated May 20, 2019, 3 pgs.

European Patent Office—Written Opinion of the International Searching Authority for International Appiication No. PCT/US2019/021914 dated May 20, 2019, 5 pgs.

Transmittal of International Preliminary Report on Patentability for International Application No. PCT/US2019/021914 dated Oct. 8, 2020, pp. 7.

* cited by examiner

DEVICE CLASSIFICATION BASED ON RANK

TECHNICAL FIELD

Aspects and implementations of the present disclosure relate to network monitoring, and more specifically, to device classification based on information available via a communication network.

BACKGROUND

As technology advances, the number and variety of devices that are connected to communications networks are rapidly increasing. Each device may have its own respective vulnerabilities which may leave the network open to compromise or other risks. The classification of devices connected to a network can be useful for monitoring and securing the communication network in order to prevent unauthorized or rogue devices from accessing network resources.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
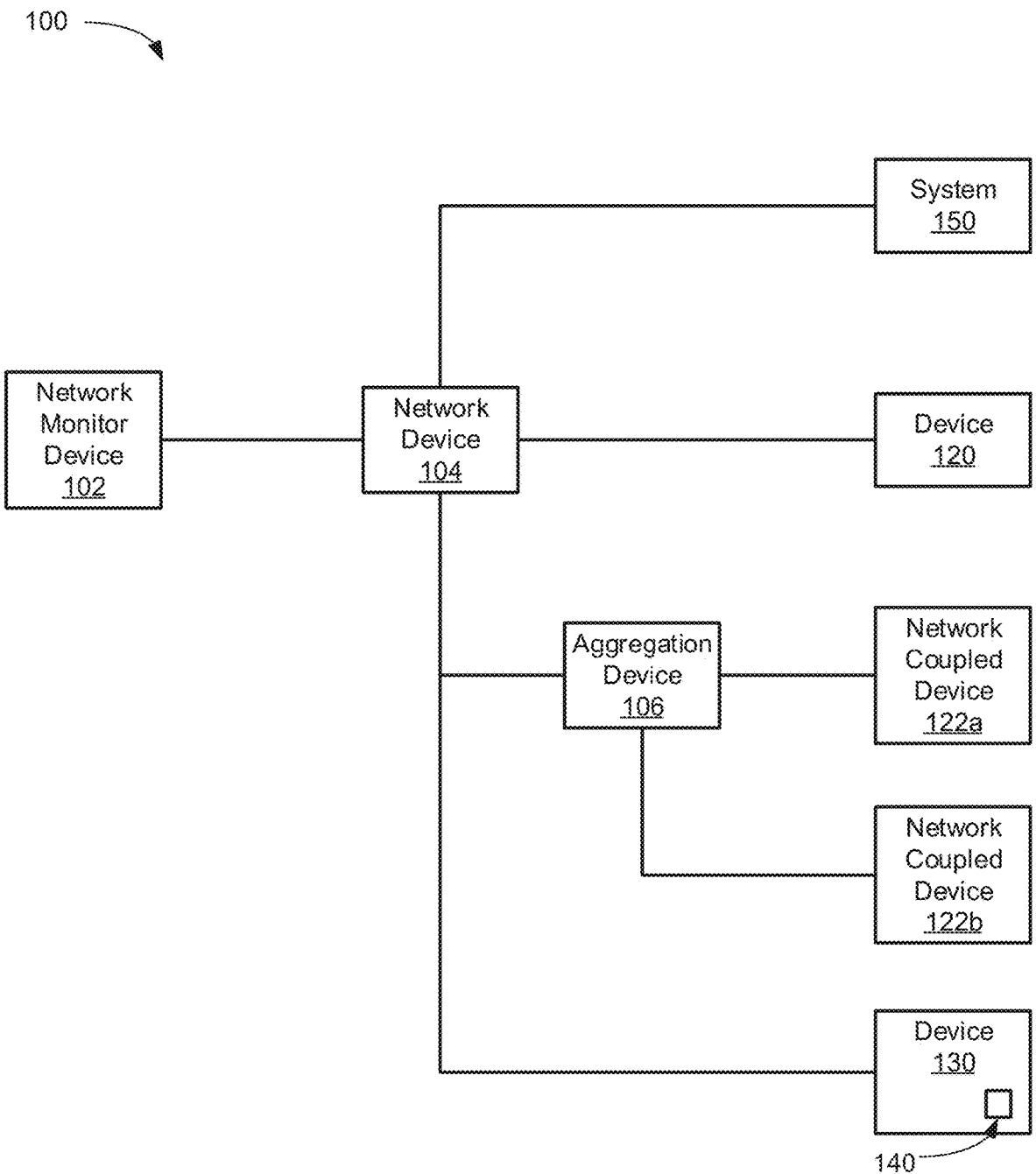
FIG. 1 depicts an illustrative communication network in accordance with one implementation of the present disclosure.

Aspects and implementations of the present disclosure are directed to device classification. The systems and methods disclosed can be employed with respect to network security, among other fields. More particularly, it can be appreciated that access to network resources by unauthorized devices is a significant and growing problem. At the same time, the proliferation of network-connected devices (e.g., smartphones, tablets, wearable devices, etc.) can make it difficult to effectively manage access to network resources for those users or devices that are authorized. Accordingly, described herein in various implementations are systems, methods, techniques, and related technologies, that enable the ongoing monitoring of network devices and activity and provide the ability to control access to network resources (e.g., by defining and employing access policies which dictate the types of devices that are or are not authorized to access certain network resources, the circumstances under which such access is or is not permitted, etc.).

In order to effectively implement network access policies, it may be advantageous to identify, classify, or otherwise determine various aspects, features, or characteristics of devices that are connected to a network or what the devices are (or are not) doing on the network. While it may be possible to determine certain types of unique distinguishing information (e.g., IP address, media access control (MAC) address, etc.) with respect to many types of network-connected devices (e.g., those connected via a Ethernet connection or Wi-Fi™), in certain scenarios it may be difficult (in terms of resources required, e.g. processing, time, network overhead) to obtain enough distinguishing characteristics to classify a particular device accurately t.

Accordingly, described herein in various implementations are systems, methods, techniques, and related technologies, which enable the classification of one or more devices that are communicatively coupled to a network. As described herein, various pieces of information can be collected from the device to be classified, other devices associated with the device to be classified, and from the network to classify the device. In addition, information from third party systems and devices (e.g., external or remote devices) may be used to classify a device.

Aspects and implementations of the present disclosure are directed to device classification. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras, wearable devices, medical devices, etc.) can make it difficult to effectively ensure that vulnerabilities or bugs are patched or updated. Accordingly, described herein in various implementations are systems, methods, techniques, and related technologies, which enable the ongoing classification of devices so that the devices can be monitored and kept secure in an effective manner.

A device profile or fingerprint is a minimal set of distinguishing characteristic information and relationships between the characteristic information (e.g., Boolean logic relationships) represented in a well-known format (e.g., extensible markup language (XML)) which can uniquely and accurately identify a given device (e.g. a Samsung Galaxy™ S8 running Android™). Device profiling or classification refers to the process of identifying devices in a network by a network device (e.g., a network access control (NAC) device) using a set of device profiles. The classification of a device may thus be determined by matching device property values with property values of one or more fingerprints and the device being classified based on having the most property values of a fingerprint matched.

Accurate device profiling or classification can be a computationally expensive process for a device (e.g., a network device, a network access control (NAC) device, a gateway, etc.). With the explosive growth in the number of network connected devices (e.g., IoT devices, Industrial IOT (IIOT) devices, etc.), it becomes important to provide accurate and scalable device visibility through device profiling while preventing a negative impact on the functionality (e.g., network functionality) of the device (e.g., network device) performing the device profiling. Another problem is that when a device matches two separate device profiles or fingerprints, a mechanism is needed to resolve the conflict without over burdening the profiling device. This may be due to some properties being hard in terms of cost or complexity of obtaining the information necessary to obtain and the information is not included in fingerprints. There may further be a problem where not enough device or traffic information is available to profile a device resulting in it being "unclassified." This may be caused by the fingerprints not being unique enough which results in them being in conflict because there is not enough information.

Current methodologies profile a device based on determining each individual property of a set of properties for a device. As the number of devices rapidly increases, evaluating each property for each device quickly results in the device profiling becoming both computationally expensive and time intensive and thus does not scale.

Embodiments are operable to optimize classification using a ranked set of properties thereby allowing the classification to be done more quickly and using less resources (e.g., CPU time, memory, resources of the device being classified, etc.). The properties can be ranked among a variety of criteria including scalability or cost, effectiveness or accuracy, robustness to spoofing, or a combination thereof. For example, the ranking of the properties based on cost and accuracy allows the quickest and most accurate properties to be evaluated first thereby enabling the classification of the device to be done in a shorter amount of time. Embodiments are further configured to resolve conflict or ambiguous classification results and unclassified classification results.

Accordingly, described herein in various implementations are systems, methods, techniques, and related technologies, which enable improved device classification. As described herein, various techniques can be used to classify devices using one or more properties.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including device classification. Different device and traffic information including device properties and traffic properties (e.g., hypertext transfer protocol (HTTP) user agent string, Nmap™ scan results, etc.) carry varying levels of information about a given device. Some of these properties are more effective than others for uniquely classifying a device. At the same time, there are varying levels of cost (e.g., CPU usage, time cost, etc.) involved in obtaining different property values. Thus, there is a cost/benefit tradeoff involved in choosing the properties used for determining a unique device classification. The solutions described herein include using heuristic measures that take into account this tradeoff to generate an ordering by which properties get evaluated by a network coupled device. This can help maximize accuracy and scalability of device classification.

The properties can be used to contribute to the determination of a device classification. Properties (e.g., HTTP header, network interface controller (NIC) vendor, etc.) may further be obtained from other devices (e.g., external or third party systems). Embodiments are configured to use a variety of properties including, but not limited to, NIC vendor (e.g., portion of a MAC address), dynamic host control protocol (DHCP) vendor class, HTTP user agent string, operating system (OS) data, network function, transmission control protocol/internet protocol (TCP/IP) Syn Ack fingerprint, virtual machine guest OS, Nmap-Banner, Windows™ version, DHCP hostname, Macintosh Manageable, DHCP device class, Linux Manageable, open ports, DHCP options list, DHCP request list, DHCP device OS, MAC Address, Macintosh OS Version, DNS Name, Linux OS version, Switch Port power over Ethernet (PoE) connected device, system description, Classified by Action or operator classified, device is a NAT device, Windows Services Installed, and Switch Port Name.

In some embodiments, a scalability rank '$s_p$' and effectiveness rank '$e_p$' may be assigned for each property 'p' used to perform device classification (e.g., by a network coupled device). The scalability is how scalable a property amongst the devices (e.g., coupled to the network). Example high scalability properties are HTTP header and NIC vendor because they can be obtained by monitoring network traffic passively without making queries to a device being classified. Other properties, e.g., Nmap scan results, involve active queries to individual devices. Such actively obtained properties are more expensive (e.g., in terms of power, processing, power, etc.) than passively obtained properties.

The ranks of properties can be normalized in the same range for scalability and for effectiveness. The properties can then be ranked based on scalability and effectiveness. For example, a set of properties may be ranked from 1 to 10 with the $10^{th}$ ranked property having the highest scalability and highest effectiveness. The $1^{st}$ ranked property has the lowest scalability and the lowest effectiveness. The $10^{th}$ ranked property would be the most scalable to obtain from the largest number of devices. The rank 1 property would be the least scalable property.

The scalability rank '$s_p$' quantifies the ease of obtaining a property 'p' from a device in comparison to other properties (e.g., ≠p). The value of $s_p$ may be based on how much time (e.g., how quickly) or what resources (e.g., memory, processing power, etc.) are involved in determining the value of a property. The value of $s_p$ is inversely proportional to the cost to obtain the property value (e.g., the higher the cost, the less the value of the scalability rank and vice versa). The cost can be in terms of time (e.g., delay), CPU memory, load on the device being classified, etc. Properties that can be evaluated using passively collected information may have particularly high scalability. Any active probing which involves actively querying a device that is run sequentially and can take a relatively large amount of time would have low scalability. For example, an Nmap scan involves queries to the device to determine the operating system based on the responses from the device. Such a query involves a round trip time, to and from the device, and a computation or determination based on the response. Other more active properties may involve running a script (e.g., Windows™ Management Instrumentation (WMI) script) on the device being classified. This may involve logging into the device and running a script on the device (e.g., using credentials assessable from another device) which uses processing resources of the device and can take a relatively considerable amount of time compared to evaluating other passive properties. As another example, the NIC vendor may be considered a relatively lightweight property which does not involve a query to the device. The NIC vendor may be obtained from a portion of the MAC address (e.g., the organizationally unique identifier (OUI) portion of the MAC address) which may be obtained from an address resolution protocol (ARP) table on a network device.

If the cost or scalability dimension is considered the 'average time to evaluate the property,' then the values of the costs can be empirically determined by measuring the average time to evaluate each property 'p.' For example, the average time to evaluate the NIC vendor can be based on measuring how long it takes a device performing classifications to get the NIC vendor for each of 100 devices and then dividing the amount of time by 100. Each property 'p' can then be assigned a scalability rank and the property with the lowest average time to compute or determine would have the highest scalability rank value. This may be done for multiple properties, the average time to evaluate determined for each property, and then the properties may be ranked according to the respective average time to evaluate. Embodiments may further use additional factors, e.g., CPU time, and combine them with the average time to evaluate each property for more complex ranking each property.

The effectiveness rank $e_p$ quantifies the effectiveness of a given property 'p' in terms of producing a low number of false positive classification or fingerprint matches in comparison to other properties (e.g., $\neq p$). The classification of a device may be determined by matching device property values with property values of one or more fingerprints and the device being classified based on having the most property values of a fingerprint matched. In other words, the effectiveness rank $e_p$ measures how reliable or accurate a property is in terms of not producing misclassifications. The higher the value of $e_p$ the lower the false positives produced due to the property p. For example, some properties, e.g., network function, are less reliable as compared to other properties, for instance, properties obtained by an agent or an HTTP header. The less reliable (e.g., lower $e_p$) a property is the more likely there will be associated misclassifications.

As another example, the NIC vendor (e.g., portion of a MAC address) may be quite reliable because if a MAC address indicates that the device is an Apple™ device then is strongly indicative that the device is an Apple™ device. In contrast, the HTTP user agent string may be somewhat less reliable because a mobile device and a desktop could run the same internet browser.

The value of $e_p$ for a property can be obtained empirically by considering a representative set of labeled data (e.g., from user feedback) and measuring misclassifications caused by using a given property 'p'. The property which is the root cause of the most number of misclassification will have the lowest effectiveness rank $e_p$. Alternatively, $s_p$ and $e_p$ can be based on predetermined information. This information can include heuristics relating to the separation of properties into two categories: 1) active scan or active probing properties; and 2) passive monitoring property with minimal or zero cost.

For example, if a user provides feedback that a camera was misclassified as a light bulb, then based on the data of the properties used for the classification, the properties that caused the misclassification can be determined. The user feedback may be received via cloud based service or other communication network data source. Based on identifying one or more properties that caused a misclassification, the effectiveness rank $e_p$ of the properties involved in the misclassification can be updated (e.g., lowered in effectiveness rank). In addition, a fingerprint including one or more property values can be updated to exclude the properties resulting in the misclassification. Over periods of time including as new properties are added or removed, embodiments support the scalability and effectiveness ranks being revised overtime and thus be dynamic (e.g., adjusted or changed dynamically).

The scalability and effectiveness ranks for each of the properties are ordered and that order is used to classify devices thereby allowing a device to be classified earlier in the classifying process. For example, as more effective properties are done earlier, a confidence threshold for classification of a device may be satisfied earlier in time. The classifying may thus be faster and more efficient than evaluating each of the properties for each device. For example, the properties may be ordered by sorting based on scalability rank and then sorting on effectiveness rank.

Figure 3:
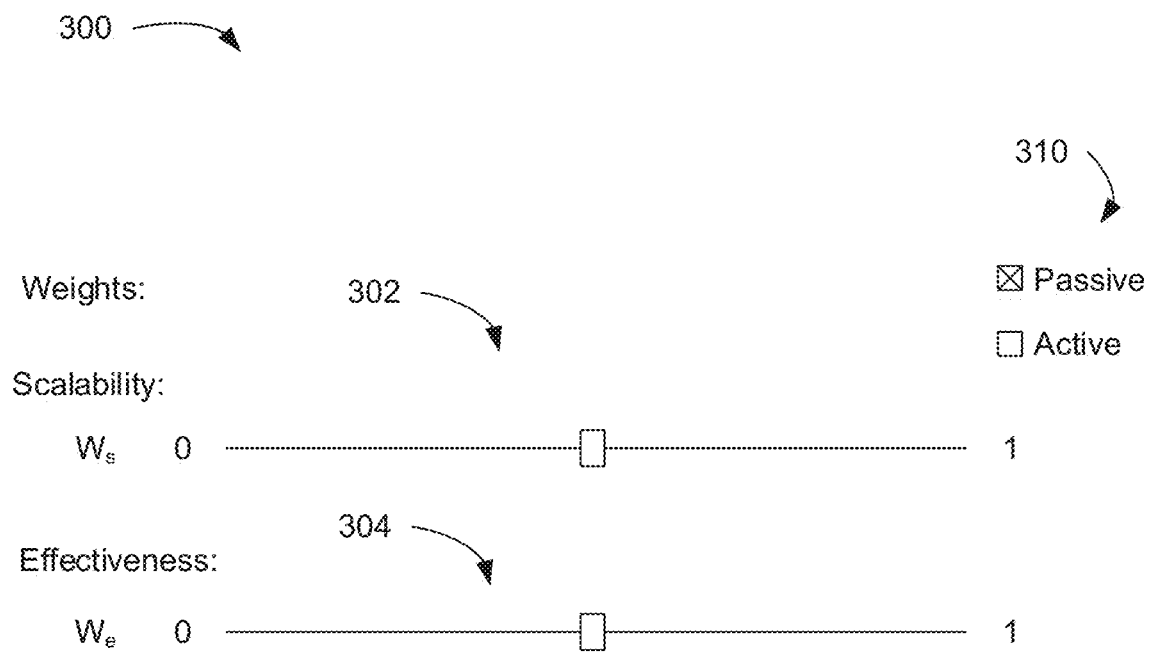
FIG. 3 depicts a diagram of aspects of an example graphical user interface in accordance with one implementation of the present disclosure.

In some embodiments, each property is scored with a score function $f(s_p, e_p)$. For example, the following equation may be used:

$$f(s_p, e_p) = w_e e_p + w_s s_p$$

Where $w_e$ is the weight of the effectiveness rank $e_p$ and $w_s$ is the weight on the scalability rank $s_p$. The weights can be user configured (e.g., according to preference) via a user interface. The weights may be configure via a graphical user interface (e.g., using a slider bar as shown in FIG. 3) or automatically configured based on experimentation. In some embodiments, a graphical user interface slider with one end associated with high scalability and the other end associated with high effectiveness can be used to set the weights. In various embodiments, a first graphical user interface slider may be associated with scalability and a second graphical user interface slider associated with effectiveness. In some embodiments, there may be a first checkbox or other user interface element for enabling or disabling passive properties and a second checkbox or other user interface element for enabling or disabling active properties. In some embodiments, the weights (e.g., $w_e$ and $w_s$) may be predetermined or preconfigured (e.g., based on empirically determined values, heuristics, etc.) and then may be adjusted by a user. In various embodiments, the weights (e.g., $w_e$ and $w_s$) may be set as a ratio of each other, e.g., $w_s = 1 - w_e$, wherein $0 \leq w_e \leq 1$.

For example, with $w_s$ set to 0 and $w_e$ set to 1, this would configure for accurate classification results with less concern for scalability issues. As another example, with $w_s$ set to 1 and $w_e$ set to 0, this would configure for high sensitivity to scalability (or less time) and less concern for a few miscalculations (e.g., quick classification of many devices). The weights may thus be used to filter out certain one or more properties that do not meet particular scalability, effectiveness, or a combination thereof standards. That is, the weights allow a subset of properties to be used or selected for classification. The ranking or ordering of the properties may then be stored to be used to classify devices. The properties can be evaluated in the scored order with the highest scored properties first.

Embodiments may support other properties for ranking properties. For example, robustness or resistance to spoofing over time could be used along with scalability and effectiveness for ranking properties. For example, NIC vendor may be considered easy to spoof compared to another property. The robustness to spoofing over time rank may be used to ensure that devices in particular environments (e.g., highly secure area or an important network segment) are classified using properties that are less likely to be spoofed or faked. The lack of a classification or classification conflict could then be used as an alert of a possibly suspicious device being introduced to the particular environment. The above mentioned equation may be modified to include a weight $w_r$ which is a weight applied to the robustness to spoofing rank $r_p$.

In some embodiments, the evaluating of each of the ordered properties can be done in a hierarchical or multiple tiered manner. For example, the NIC vendor and HTTP user agent string may be passively obtained and the device being classified be determined to be a printer. If the device is a printer that supports SNMP, an active scan of the device using SNMP can be used to determine that the device is a particular printer model. If the device was not a printer or not a printer that supports SNMP, the active SNMP scanning may not be performed, thereby conserving processing resources and time during the classifying process.

Embodiments thus support determining a device classification using less than the full set of properties where possible thereby completing device classifying faster and using less resources (e.g., memory, processing power, energy, etc.). Based on evaluating a few properties that have high scalability and high effectiveness, many devices of a network may be classified and devices that are not classified can be evaluated using additional properties. That is, the initial results from one or more properties can be used as a basis for evaluating unclassified devices using more involved or active scanning techniques.

For example, if there are 60,000 network coupled devices on a network, evaluating each of the devices on 10 properties would use significantly more resources than if four or five properties were used to classify the 60,000 devices. Embodiments thus support some or a majority of devices on a network being rapidly classified.

Embodiments are further operable to resolve classification conflicts (e.g., an ambiguous classification result, for instance, where the available property values match more than one fingerprint) where a device may be classified as two or more types of devices. For example, if a device based on classification may be a Windows™ device or a phone, this can be considered a conflict. In order to resolve the conflict, properties that involve more complicated evaluation may be evaluated. For example, the services running on a device may not normally be evaluated because of the resources (e.g., time, CPU resources, etc.) involved and does not scale for a large number of devices. In some embodiments, a determination of the services running on a machine may be sufficiently intensive or costly that the services property is not part of an ordered list of properties used for classification. The evaluation of the services running on a machine may be useful for resolving the conflict by querying the device being classified for the services and then using the result of the services query to resolve the conflict. Using particular properties on a number of conflict classified devices can increase the number of classified devices at the same time conserving computing resources (e.g., relative to evaluating each property on each device).

In various embodiments, the classification may be performed on demand based on user initiation (e.g., via graphical user interface or command line interface). The user initiated classification may be performed on one or more devices selected by a user for classification. The user initiation classification may be performed using one or more properties that are resource intensive (e.g., time, computing resources, etc.), as needed, in order to classify the one or more selected devices. The resources intensiveness of the user initiated classification may be based on a graphical user interface element (e.g., slider) that allows selecting the ranking of one or more properties (e.g., based on scalability and effective) that will be used in the classification process.

The rankings of properties can be used to perform classification in multiple ways. The ranking can be used to apply cost and accuracy sensitive classification for each policy and each device (e.g., each device communicatively coupled to a network). The rankings can be used for cost and accuracy sensitive data collection or property evaluation for unclassified devices with too few known properties (e.g., devices which are unclassified based on one or more properties). The rankings may further be used for cost and accuracy sensitive conflict resolution for devices matching multiple profiles by hierarchically evaluating properties (e.g., evaluating more costly properties after less costly properties have been evaluated without a classification result above a threshold). The ranking may be used for on demand (e.g., user initiated) cost and accuracy sensitive device profiling. The various uses of rankings may be changed via changes in a classification engine or a policy update (e.g., policy patch).

When the process of evaluating property in the scored order has completed, if the result of the classification is still 'unclassified' or has 'multiple' matches, it may indicate a problem with the underlying device fingerprints (e.g., unknown device or the fingerprints are not granular enough and in need of modification) and the lack of information available through properties for performing device profiling. In some embodiments, information (e.g., properties and associated values, user entered information, etc.) about a device may be uploaded to a centralized data store (e.g., cloud based storage) for providing feedback about the classification process and to enable updating of the classification process, updating fingerprints, or a combination thereof.

Cost and accuracy sensitive profiling of devices enhances device classification by improving user control and device profiling scalability and accuracy including allowing a user to customize the classification. The increased speed and accurate visibility (as a result of the classification) can be used to be control access of devices to network resources and to interact with external or third party systems to manage device (e.g., IoT devices) in a more efficient manner. The classification (e.g., based on cost and accuracy) of ranked properties is advantageous over performance of flat evaluation of each property of each device without consideration of costs and benefits involved. Embodiments further provide intelligent control of device profiling with the flexibility that preset, dynamic, or user configured levels of effort or scalability and confidence or effectiveness can be used. For example, a user may effectively disable active properties or probing while only allowing passive property monitoring for performance or the user may wish to rely on properties with high effectiveness for accuracy and set the weights $w_e$ and $w_s$ accordingly.

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor communication using a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of devices by network monitor device 102 may be based on a combination of one or more pieces of information including traffic analysis, information from external or remote systems (e.g., system 150), communication (e.g., querying) with an aggregation device (e.g., aggregation device 106), and querying the device itself (e.g., via an API, CLI, or web interface), which are described further herein. Network monitor device 102 may be operable to use one or more APIs to communicate with aggregation device 106, device 120, device 130, or system 150. Network monitor device 102 may monitor communication dynamically, periodically, or a combination thereof.

Information from one or more external or $3^{rd}$ party systems (e.g., system 150) may further be used in determining one or more property values associated with a device. For example, a vulnerability assessment (VA) system may be queried along with an API call or command sent to aggregation device 106 (optionally) to determine property values associated with network coupled devices 122a-b. External or $3^{rd}$ party systems may also be used to perform a scan or a check on a device to determine one or more property values.

Device 130 can include agent 140. The agent 140 may be a hardware component, software component, or some combination thereof configured to gather information, including one or more property values, associated with device 130 and send that information to network monitor device 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), MAC address, processor utilization, unique identifiers, computer name, account access activity, etc. The agent 140 may be configured to provide different levels and pieces of information based on device 130 and provide the information available to agent 140 from device 130 to network monitor device 102. Agent 140 may be able to store logs of information associated with device 130. Network monitor device 102 may utilize agent information from the agent 140. While network monitor device 102 may be able to receive information from agent 140, installation or execution of agent 140 on many devices may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other IOC.

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor device 102.

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) and device classification by network monitor device 102.

The firewall (FW) system may be configured to monitor and control incoming and outgoing network traffic (e.g., based on security rules). The FW system may provide information to network monitor device 102 about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor device 102 which may be used to monitor devices and control network access of one or more devices. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of the device being monitored in real-time which can then be used to determine a classification of the device.

Aggregation device 106 may be configured to communicate with network coupled devices 122a-b and provide network access to network coupled devices 122a-b. Aggregation device 106 may further be configured to provide information (e.g., operating system, device software information, device software versions, device names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
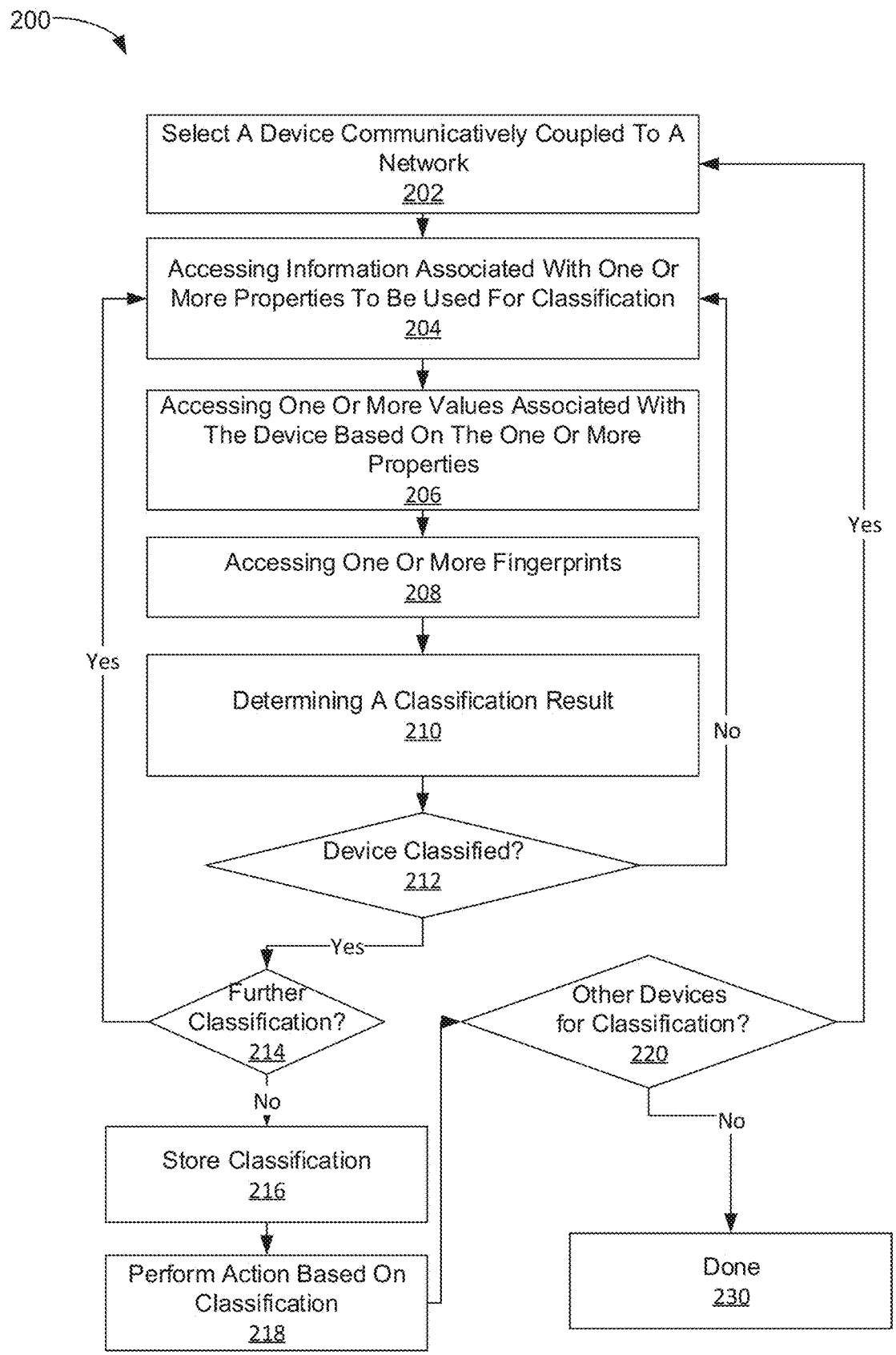
FIG. 2 depicts a flow diagram of aspects of a method for device classification in accordance with one implementation of the present disclosure.

With reference to FIG. 2, flowchart 200 illustrates example functions used by various embodiments. Although specific function blocks ("blocks") are disclosed in flowchart 200, such blocks are examples. That is, embodiments are well suited to performing various other blocks or variations of the blocks recited in flowchart 200. It is appreciated that the blocks in flowchart 200 may be performed in an order different than presented, and that not all of the blocks in flowchart 200 may be performed.

FIG. 2 depicts a flow diagram of aspects of a method for device classification in accordance with one implementation of the present disclosure. Various portions of flowchart 200 may be performed by different components (e.g., components of system 400) of a device (e.g., network monitor device 102). Flowchart 200 depicts a process for profiling or classifying a device using a set of properties ordered based on associated ranks. The classification may be based on properties selected based on ranks or weights, as described herein.

At block 202, a device communicatively coupled to a network is selected. The device may be selected as part of a periodic scan of the network (e.g., a scan of network 100 by network monitor device 102), selection by a user (e.g., through a graphical user interface), or the device may be selected upon being communicatively coupled to the network (e.g., the device being discovered). The selecting of the device coupled to the network may include selecting the device in response to the device being recoupled to the network. In some embodiments, a device may be selected based having a classification result associated therewith being a classification conflict or an unclassified classification result, as described herein.

At block 204, information associated with one or more properties to be used for classification is accessed (e.g., collected and accessed). The information may include properties, rankings (e.g., based on scalability and effectiveness), and weights (e.g., to be used to select one or more properties to be used to perform classification), as described herein. The properties and associated information may be accessed or filtered based on user input. If block 204 is being performed again for a device (e.g., after block 212), one or more additional properties (e.g., more computational intensive, for instance, active scanning or querying) may be selected for use for classifying the device (e.g., performing block 206) and thereby more properties values are used to classify the device.

At block 206, one or more values associated with the device are accessed based on the one or more properties. The values associated with the device may be accessed from a local data store (e.g., stored based on traffic monitoring), accessed by monitoring traffic (e.g., via a span port, traffic mirroring, etc.), or accessed by actively querying or probing the device based on the one or more selected properties. For example, a MAC address may be accessed from an ARP table based on IP address to access the NIC vendor (portion of the MAC address) therefrom or an HTTP user agent string may be accessed by monitoring network traffic from the device.

At block 208, one or more fingerprints are accessed. The fingerprints may each include one or more property values and an associated classification, as described herein. For example, a fingerprint may have NIC vendor value that is associated with classification of a printer from a particular manufacturer.

At block 210, a classification result is determined. The classification result is determined based on the information associated with the one or more properties. The classification result is determined according to the values associated with a subset of properties for which values associated with the device were accessed and matched to the one or more fingerprints. For example, if the high scalability properties of NIC vendor and HTTP user agent string were selected, then the classification of the device is determined based on those two properties. The classification result may be: a device classification identifier (e.g., indicating the device is a printer or an IP camera), a conflict where two or more device fingerprints match the evaluated properties. The classification result may also be an unclassified result where the evaluated properties do not match a fingerprint. This classification result may also be used another process (e.g., another algorithm, performed by another system, for instance system 150) to further clarify the classification result.

At block 212, whether the device is classified or not is determined. The determination is based on the classification result. If the device is classified (e.g., classification result is device classification), then block 214 may be performed. If the device is not classified (e.g., the classification result is conflict or unclassified), block 204 may be performed.

At block 214, whether further classification should be performed is determined. Further classification can include determining a particular model of device using one or more additional properties (e.g., via block 204). For example, if the device is determined to be a printer that support SNMP, then an SNMP query may be used to determine the particular printer model. If a further classification is to be determined, block 204 may be performed. If further classification is not to be performed, block 216 may be performed.

At block 216, the classification is stored. The classification may be stored to be used to be visually depicted in a graphical user interface (GUI) along with other device classifications, used for monitoring the device for anomalous behavior, used for an action to be performed based on the classification, etc., as described herein.

At block 218, an action may be performed based on the classification. The action may include restricting network access of the classified device (e.g., by configuring a network device to limit network access of the classified device), a notification may be sent (e.g., indicating that a new device has been found or classified, has a vulnerability, etc.), and the VLAN of the classified device may be changed. The action may further include gathering information based on the classification (e.g., determining a particular device model, serial number, etc.), and performing administrative tasks (e.g., updating the software of the device, etc.).

At block 220, whether there are other devices to be classified is determined. The determination can be based on whether there are devices that have yet to be classified or if new devices have come on the network (e.g., in a queue of devices to be classified). If there are other devices to be classified, block 202 may be performed. If there are no other devices to be classified, then block 230 may be performed.

At block 230, the device classification process is done until one or more devices is selected for classification.

FIG. 3 depicts a diagram of aspects of an example graphical user interface in accordance with one implementation of the present disclosure. Example graphical user interface (GUI) 300 is configured for adjusting the weights applied to the scalability ranks and effectiveness ranks (e.g., for the equation above) of properties to be used for classifying a device, as described herein. Example GUI 300 includes check box area 310 and slider elements 302 and 304. Check box area 310 allows the use of passive properties and the use of active properties during classification to be turned on or off through checking or unchecking respective boxes. Slider element 302 allows for adjusting the scalability rank weight (e.g., $w_s$) between zero and one. Slider element 304 allows for adjusting the effectiveness rank weight (e.g., $w_e$) between zero and one. It is appreciated that different numeric ranges from those shown in FIG. 3 may be used. In some embodiments, a single slider may be used and with a slider that is operable for selection of increased scalability at one end of the slider and higher effectiveness at the second end of the slider, as described herein.

Figure 4:
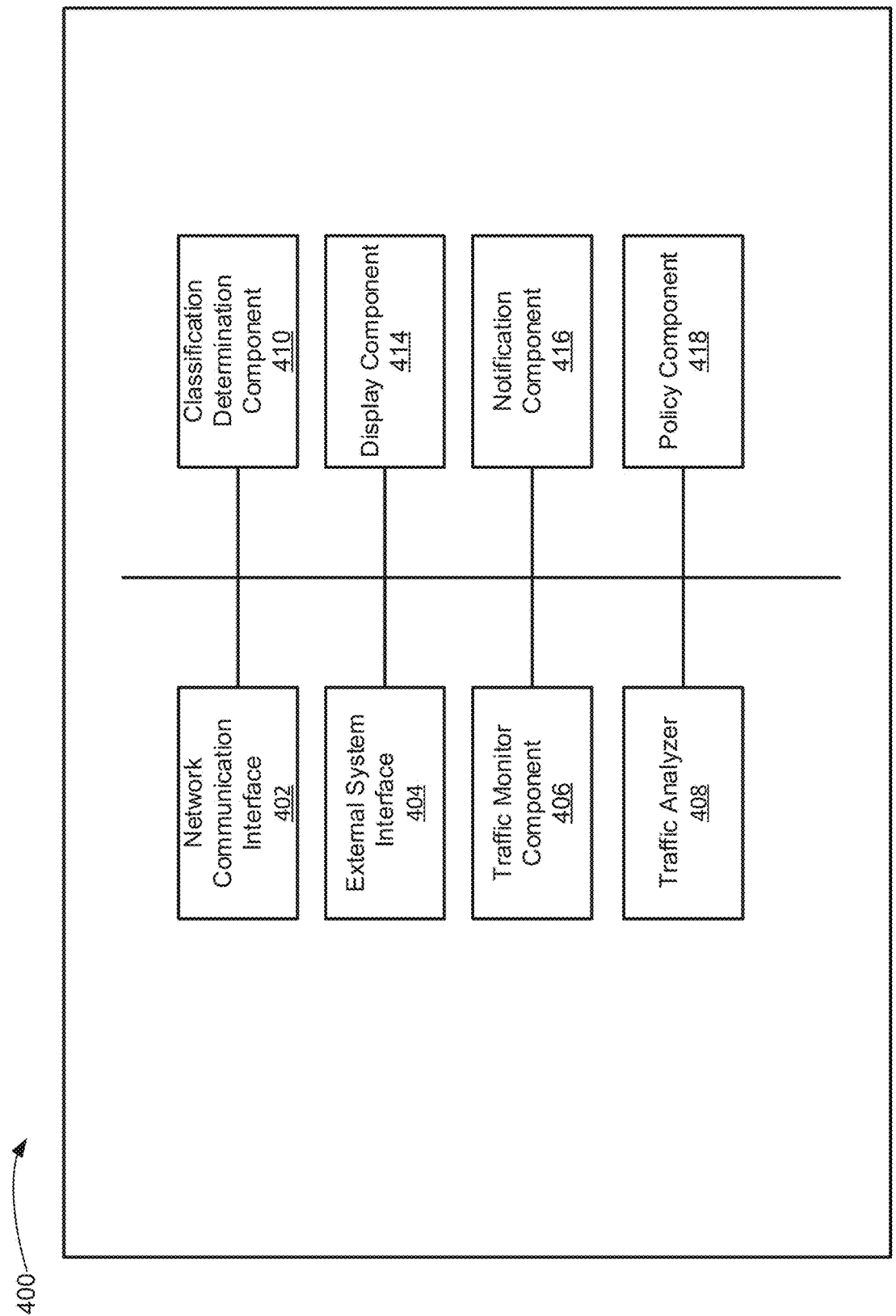
FIG. 4 depicts illustrative components of a system for device classification in accordance with one implementation of the present disclosure.

FIG. 4 illustrates example components used by various embodiments. Although specific components are disclosed in system 400, it should be appreciated that such components are examples. That is, embodiments are well suited to having various other components or variations of the components recited in system 400. It is appreciated that the components in system 400 may operate with other components than those presented, and that not all of the components of system 400 may be required to achieve the goals of system 400.

FIG. 4 depicts illustrative components of a system for device classification in accordance with one implementation of the present disclosure. Example system 400 includes a network communication interface 402, an external system interface 404, a traffic monitor component 406, a traffic analyzer 408, a classification determination component 410, a display component 414, a notification component 416, and a policy component 418. The components of system 400 may be part of a computing system or other electronic device (e.g., network monitor device 102) or a virtual machine and be operable to classify one or more devices communicatively coupled to a network. For example, the system 400 may further include a memory and a processing device, operatively coupled to the memory, which may perform the functions of or execute the components of system 400. The components of system 400 may access various data associated with a device being profiled in order to determine a classification of the device. It is appreciated that the modular nature of system 400 may allow the components to be independent and allow flexibility to enable or disable individual components or to extend/upgrade components without affecting other components thereby providing scalability and extensibility. System 400 may perform one or more blocks of flow diagram 200.

Communication interface 402 is operable to communicate with one or more devices (e.g., network device 104) coupled to a network that are coupled to system 400 and receive or access information about devices (e.g., information associated with the communication of one or more devices, software versions, etc.) coupled to the network, as described herein. The communication interface 402 may be operable to work with one or more components to initiate access to information associated with properties to be used for classifying a device, access to fingerprints, determination of one or more values associated with a property of a device, and classification of a device.

External system interface 404 is operable to communicate with one or more third party, remote, or external systems (e.g., system 150) to access information about a device to be classified. External system interface 404 may further store the accessed information in a data store (e.g., database, cloud storage, etc.). For example, external system interface 404 may access the NIC vendor and other values associated with properties from one or more third party systems and store the accessed information in the data store. External system interface 404 may be operable to communicate with a vulnerability assessment (VA) system, an advanced threat detection (ATD) system, a mobile device management (MDM) system, a firewall (FW) system, a switch system, an access point (AP) system, etc., as described herein. External system interface 404 may query a third party system using an API or CLI command. For example, external system interface 404 may query a firewall for information (e.g., NIC vendor) about a device or for a list of devices that are communicatively coupled to the firewall. In some embodiments, external system interface 404 may query a firewall or other system for information of communications associated with a device (e.g., for passive property value collection).

Traffic monitor component 406 is operable to monitor network traffic of a device being classified, as described herein. Traffic analyzer 408 is configured to perform analysis of network traffic (e.g., in real-time, with machine learning, etc.) to and from a device being classified. Traffic analyzer 408 may have a packet engine operable to access packets of network traffic (e.g., passively) and analyze the network traffic. For example, packets associated with communication requests may be accessed and analyzed to determine a HTTP user agent string for use in classifying a device. The traffic analyzer 408 may be configured to perform active or passive traffic analysis or a combination thereof. The traffic analyzer 408 may further be able to access and analyze traffic logs from one or more devices (e.g., network device 104, system 150, or aggregation device 106) or from a device being classified. The traffic analyzer 408 may further be able to access traffic analysis data associated with a device being classified, e.g., where the traffic analysis is performed by a third party system.

Classification determination component 410 is operable to determine a device classification based on one or more properties, fingerprints, and information collected from or associated with a device, as described herein. Classification determination component 410 may perform one or more blocks of flow chart 200. Classification determination component 410 may store a classification result (e.g., a device classification, classification conflict, or unclassified) in a data store for access by one or more components of system 400.

Display component 414 is configured to optionally display a graphical user interface or other interface (e.g., command line interface) for depicting various configuration settings for classifications (e.g., FIG. 3), as described herein.

Notification component 416 is operable to initiate one or more notifications based on a device being unclassified or a device having a classification conflict, as described herein. The notification may be any of a variety of notifications, e.g., IT ticket, email, SMS, a HTTP notification, etc., as described herein.

Policy component 418 is operable for initiating or triggering one or more remediation actions or security actions based on a device classification, as described herein. Policy component 418 may further be configured to perform other functions including checking compliance status, finding open ports, etc. Policy component 418 may restrict network access, signal a patch system or service, signal an update system or service, etc., as described herein. The policy component 418 may thus, among other things, invoke automatic restriction of network access of a device (e.g., that has been classified and has an associated vulnerability).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 400 may be software stored on a non-transitory computer readable medium having instructions encoded thereon that, when executed by a processing device, cause the processing device to detect a device communicatively coupled to a network. The instructions may further cause the processing device to access one or more properties, where each of the one or more properties has an associated rank. The instructions may further cause the processing device to select one or more properties based on a respective associated rank and access information associated with the device based on the selected one or more properties. The instructions may further cause the processing device to determine, by a processing device, a classification associated with the device based on the information associated with the device and based on the selected one or more properties. The instructions may further cause the processing device to store the classification associated with the device.

In some embodiments, the rank associated with a property is based on one or more resources associated with the property (e.g., the scalability of the property, as described herein). In various embodiments, the rank associated with a property is based on an accuracy or effectiveness level associated with the property. In some embodiments, the rank associated with a property is based on a resistance to spoofing associated with the property. In various embodiments, the selecting of the one or more properties is further based on a rank threshold (e.g., properties above a particular rank threshold are selected).

Figure 5:
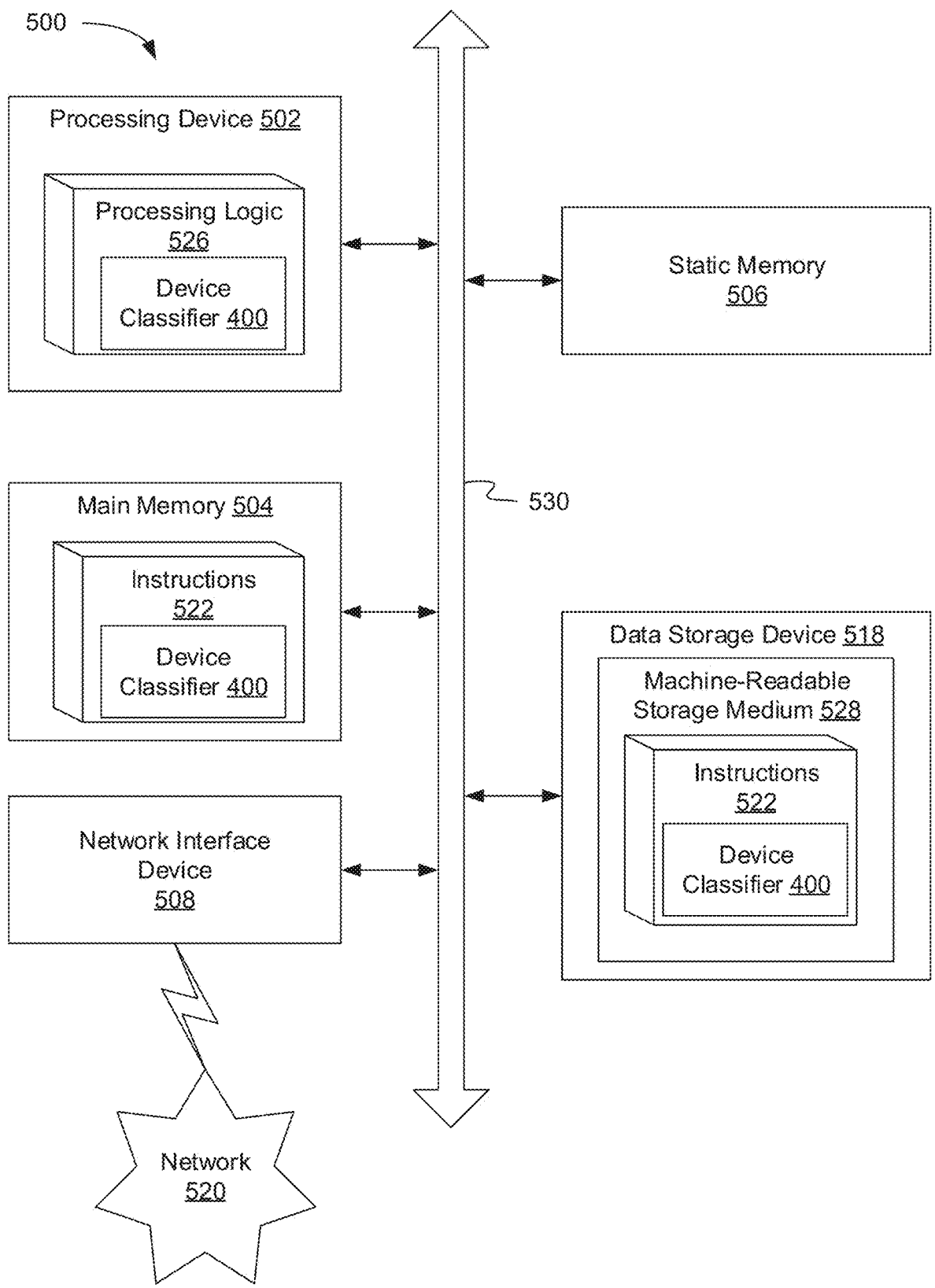
FIG. 5 is a block diagram illustrating an example computer system, in accordance with one implementation of the present disclosure.

FIG. 5 illustrates a diagrammatic representation of a machine in the example form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 500 may be representative of a server, such as network monitor device 102 configured to classify one or more devices, as described herein.

The exemplary computer system 500 includes a processing device 502, a main memory 504 (e.g., read-only memory (ROM), flash memory, dynamic random access memory (DRAM), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526, which may be one example of system 400 shown in FIG. 4, for performing the operations and steps discussed herein.

The data storage device 518 may include a machine-readable storage medium 528, on which is stored one or more set of instructions 522 (e.g., software) embodying any one or more of the methodologies of functions described herein, including instructions to cause the processing device 502 to execute device classifier 400. The instructions 522 may also reside, completely or at least partially, within the main memory 504 or within the processing device 502 during execution thereof by the computer system 500; the main memory 504 and the processing device 502 also constituting machine-readable storage media. The instructions 522 may further be transmitted or received over a network 520 via the network interface device 508.

The machine-readable storage medium 528 may also be used to store instructions to perform a method for device classification, as described herein. While the machine-readable storage medium 528 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
    selecting a device communicatively coupled to a network;
    accessing a plurality of device properties available to be used to classify the device;
    determining a rank for each of the plurality of device properties, wherein the rank is associated with at least one of an effectiveness, cost, or scalability of using the device property for device classification;
    generating an ordered list of the plurality of device properties based on the rank for each of the plurality of device properties;
    selecting a subset of device properties from the plurality of device properties available to be used to classify the device based on a respective position of each of the device properties in the ordered list and a respective associated rank of the subset of device properties;
    accessing information associated with the device based on the selected subset of device properties, wherein the information comprises values of the selected subset of device properties for the device;
    determining a classification associated with the device based on the information associated with the device and the selected subset of device properties from the plurality of device properties available to be used to classify the device;
    storing the classification associated with the device; and
    performing an action based on the classification, wherein the action includes at least one of a remediation action, an informational action, or a logging action.

2. The method of claim 1, wherein the rank associated with a property is based on one or more resource costs associated with classifying the device based on the property.

3. The method of claim 1, wherein the rank associated with a property is based on an accuracy level associated with the property.

4. The method of claim 1, wherein the rank associated with a property is based on a resistance to spoofing associated with the property.

5. The method of claim 1, wherein the selecting of the subset of properties is further based on a rank threshold.

6. The method of claim 1, wherein the selecting of the subset of properties is further based on whether the each of the subset of properties are passive or active.

7. The method of claim 1, wherein the respective rank associated with the subset of properties are dynamically adjustable.

8. The method of claim 1, wherein the respective rank associated with the subset of properties is based on a score function.

9. The method of claim 1 further comprising:
in response to a classification confidence value associated with the classification being below a threshold, selecting an additional property from the plurality of properties available to be used to classify the device based on the respective associated rank of the additional property; and
determining an additional classification based on the information associated with the device and based on the additional property and the subset of properties according to the respective ranks of the additional property and the subset of properties.

10. The method of claim 9, wherein the additional property is associated with a larger amount of time than at least one of the subset of device properties.

11. The method of claim 9, wherein the rank associated with a property is user configurable.

12. The method of claim 9, wherein the additional property is selected to resolve a classification conflict.

13. The method of claim 9, wherein the additional property is selected to classify a previously unclassified device.

14. A system comprising:
a memory; and
a processing device, operatively coupled to the memory, to:
select a device communicatively coupled to a network;
access a plurality of device properties available to be used to classify the device;
determine a rank for each of the plurality of device properties, wherein the rank is associated with at least one of an effectiveness, cost, or scalability associated with using the device property for device classification;
generate an ordered list of the plurality of device properties based on the rank for each of the plurality of device properties;
select a subset of device properties from the plurality of device properties available to be used to classify the device based on a respective position of each of the device properties in the ordered list and a respective associated rank of the subset of device properties;
access information associated with the device based on the selected subset of device properties, wherein the information comprises values of the selected subset of device properties for the device from the plurality of device properties available to be used to classify the device;
determine a classification associated with the device based on the information associated with the device and the selected subset of device properties;
store the classification associated with the device; and
perform an action based on the classification wherein the action includes at least one or a remediation action, an informational action, or a logging action.

15. The system of claim 14, wherein the rank associated with a property is based on one or more resources associated with the property.

16. The system of claim 14, wherein the rank associated with a property is based on an accuracy level associated with the property.

17. The system of claim 14, wherein the rank associated with a property is based on a resistance to spoofing associated with the property.

18. The system of claim 14, wherein the selecting of the one or more device properties is further based on a rank threshold.

19. A non-transitory computer readable medium having instructions encoded thereon that, when executed by a processing device, cause the processing device to:
select a device communicatively coupled to a network;
access a plurality of device properties available to be used to classify the device;
determine a rank for each of the plurality of device properties, wherein the rank is associated with at least one of an effectiveness, cost, or scalability associated with using the device property for device classification;
generate an ordered list of the plurality of device properties based on the rank for each of the plurality of device properties;
select a subset of device properties from the plurality of device properties available to be used to classify the device based on a respective position of each of the device properties in the ordered list and a respective associated rank of the subset of device properties;
access information associated with the device based on the selected subset of device properties, wherein the information comprises values of the selected subset of device properties for the device;
determine, by a processing device, a classification associated with the device based on the information associated with the device and the selected subset of device properties from the plurality of device properties available to be used to classify the device;
store the classification associated with the device; and
perform an action based on the classification, wherein the action includes at least one of a remediation action, an informational action, or a logging action.

20. The non-transitory computer readable medium of claim 19, wherein the rank associated with a property is based on one or more resources associated with the property.

21. The non-transitory computer readable medium of claim 19, wherein the rank associated with a property is based on an accuracy level associated with the property.

22. The non-transitory computer readable medium of claim 19, wherein the rank associated with a property is based on a resistance to spoofing associated with the property.

23. The non-transitory computer readable medium of claim 19, wherein the selecting of the subset of device properties is further based on a rank threshold.

* * * * *